(12) United States Patent
Chisholm et al.

(10) Patent No.: US 6,951,400 B2
(45) Date of Patent: Oct. 4, 2005

(54) HIGH INDEX COATED LIGHT MANAGEMENT FILMS

(75) Inventors: Bret Chisholm, Clifton Park, NY (US); Eugene Olczak, Glenville, NY (US); Marc Schaepkens, Ballston Lake, NY (US); Dennis Coyle, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 10/248,129

(22) Filed: Dec. 19, 2002

(65) Prior Publication Data

US 2004/0109305 A1 Jun. 10, 2004

Related U.S. Application Data

(63) Continuation-in-part of application No. 10/065,957, filed on Dec. 4, 2002.

(51) Int. Cl.[7] ............................................. G01D 11/28
(52) U.S. Cl. .................. 362/29; 362/326; 362/331; 362/332; 362/333; 362/339; 362/337; 362/330; 362/293; 428/336; 359/487; 359/500
(58) Field of Search .......................... 362/29, 326, 331, 362/332, 333, 339, 337, 330, 293; 428/336; 359/599

(56) References Cited

U.S. PATENT DOCUMENTS

| | | | |
|---|---|---|---|
| 3,895,155 A | * 7/1975 | Shukuri et al. | ............. 428/206 |
| 4,556,288 A | 12/1985 | Sekimura | |
| 4,906,070 A | 3/1990 | Cobb, Jr. | |
| 5,076,674 A | * 12/1991 | Lynam | ........................ 359/274 |
| 5,084,355 A | * 1/1992 | Takahashi et al. | .......... 428/457 |
| 6,163,358 A | 12/2000 | Nonaka et al. | |
| 6,172,725 B1 | 1/2001 | Lengyel | |
| 6,231,200 B1 | * 5/2001 | Shinohara et al. | ............ 362/31 |
| 6,437,921 B1 | 8/2002 | Whitehead | |
| 6,636,358 B2 | * 10/2003 | Umemoto et al. | .......... 359/599 |
| 6,673,438 B1 | * 1/2004 | Bond et al. | ................. 428/336 |

FOREIGN PATENT DOCUMENTS

| | | |
|---|---|---|
| EP | 0 573 905 | 12/1993 |
| EP | 0 898 195 | 2/1999 |
| FR | 2 731 806 | 9/1996 |
| WO | WO 01/29137 | 4/2001 |

* cited by examiner

*Primary Examiner*—Stephen Husar
*Assistant Examiner*—Bertrand Zeade
(74) *Attorney, Agent, or Firm*—Foley & Lardner LLP

(57) ABSTRACT

There is provided an optical structure. The optical structure includes a light source. The optical structure also includes an organic light management film having an index of refraction of less than 1.7 disposed above the light source, and a transparent inorganic film having an index of refraction of greater than 1.7 disposed adjacent the organic light management film. A optical device is also provided including the organic light management film and the transparent inorganic film. A method of forming the optical structure is also provided. The method includes depositing the transparent inorganic film under vacuum.

39 Claims, 8 Drawing Sheets

HIGH INDEX COATED LIGHT MANAGEMENT FILMS

CROSS REFERENCE TO RELATED APPLICATIONS

This application is a continuation-in-part application of U.S. application Ser. No. 10/065,957, filed on Dec. 4, 2002, entitled "POLARIZATION SENSITIVE OPTICAL SUBSTRATE", which is hereby incorporated by reference in its entirety.

BACKGROUND OF INVENTION

This invention is related generally to high refractive index light management films, and devices incorporating such films, and methods for forming such films.

Light management films are known to be used in optical device applications such as, for example, for liquid crystal displays (LCDs). Light management films in LCDs may include, for example, one or more quarter wave plates, brightness enhancing films, retardation foils, diffuser films, color filters, high pass filters, band pass filters, and low pass filters. These light management films are typically formed of organic materials with a refractive index typically less than 1.7. Depending on the application, the light management films may include a number of raised features.

SUMMARY OF INVENTION

In accordance with one aspect of the present invention, there is provided an optical structure comprising: a light source; an organic light management film having an index of refraction of less than 1.7 disposed above the light source; and a transparent inorganic film having an index of refraction of greater than 1.7 disposed adjacent the organic light management film.

In accordance with another aspect of the present invention, there is provided an optical device comprising: a backlight comprising a source of light; a modulation array comprising a liquid crystal material disposed above the back light; an organic light management film having an index of refraction of less than 1.7 disposed above the backlight; and a transparent inorganic film having an index of refraction of greater than 1.7 disposed adjacent the organic light management film.

In accordance with another aspect of the present invention, there is provided a method of forming an optical structure comprising: providing an organic light management film having an index of refraction of less than 1.7; depositing under vacuum a transparent inorganic film having an index of refraction of greater than 1.7 on the organic light management film; and disposing the organic light management film into an optical structure which includes a light source before or after the step of depositing under vacuum.

DETAILED DESCRIPTION OF THE PREFERRED EMBODIMENTS

Reference will now be made in detail to presently preferred embodiments of the present invention. Wherever possible, the same reference numbers will be used throughout the drawings to refer to the same or like parts.

The present inventors have realized that applying an inorganic high index of refraction material, i.e., a material with an index of refraction greater than 1.7, preferably greater than 2, adjacent an organic light management film with an index of refraction less than 1.7, preferably less than 1.5, can enhance the optical effects achieved with the organic light management film. The organic light management film with the adjacent high index inorganic film can manipulate the directionality of the light toward a viewer, or select certain polarizations over others. The high index film, by further affecting the directionality of light, may improve the viewing angle for a viewer of and LCD and the contrast of an LCD display. Thus, a high index film on a low index light management film enhances the specific performance of the coated light management film. In particular the high index film may be used in an LCD to increase efficiency or enhance wavelength or polarization selectivity.

Figure 1:
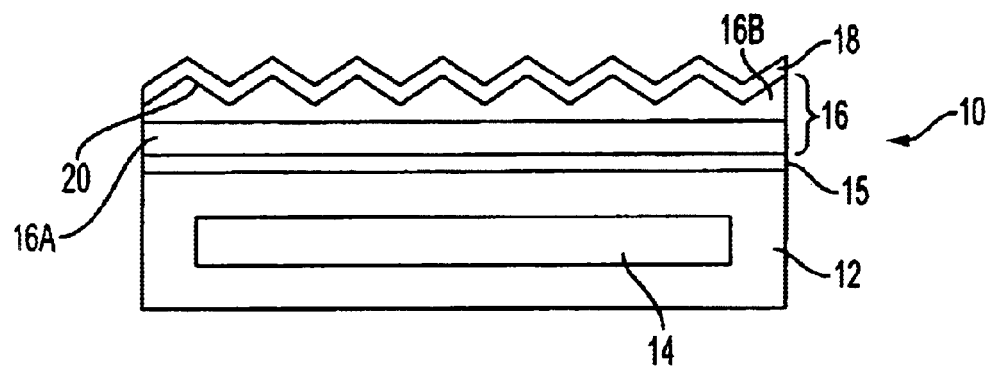
FIG. 1 is a side view of an optical structure according to a preferred embodiment of the invention.

FIG. 1 is a schematic illustration of an optical structure according to an embodiment of the invention. The optical structure 10 includes a light source 14 in a substrate 12, with an organic light management film 16 disposed above the light source 14. The organic light management film 16 may be a quarter wave plate, brightness enhancing film, retardation foil, diffuser film, color filter, high pass filter, band pass filter, or low pass filter, for example. If the organic light management film 16 is a color filter, it may be a color filter array with individual red, blue and green pixel sized filters.

If it is a filter, the filter might be used as a color selective transflector, a neutral density filter, an IR blocking filter or a UV blocking filter, for example.

The optical structure 10 also includes a high index (i.e., an index of refraction greater than 1.7) transparent inorganic film 18 adjacent the organic light management film 16. The organic light management film 16 and the transparent inorganic film 18 may also be arranges as a number of alternating layers, i.e., a plurality of films 18 alternating with a plurality of films 16. The organic light management film 16 may have a plurality of raised features 20, such as prismatic features, for example. The transparent inorganic film 18 may be disposed conformally on the organic light management film 16 with the plurality of raised features 20.

In the embodiment of FIG. 1, the organic light management film 16 comprises two sublayers, a substrate layer 16A and an overlayer 16B. While the substrate layer 16A does not have raised features, the overlayer 16 does have the raised features 20.

Figure 2:
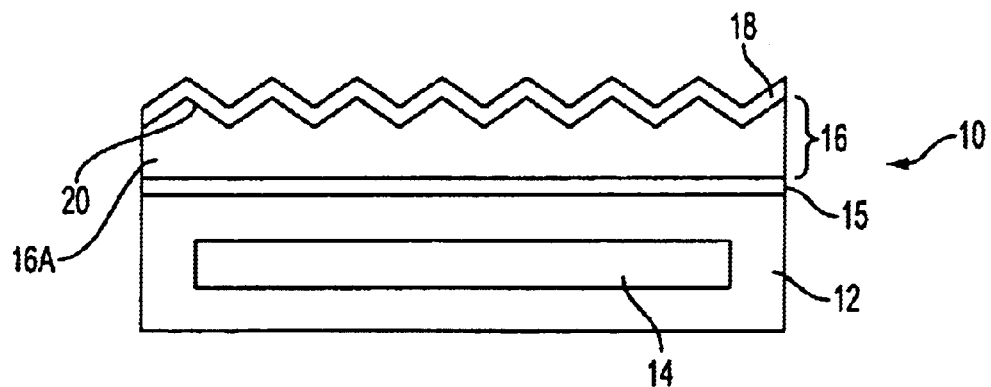
FIG. 2 is a side view of an optical structure according to another preferred embodiment of the invention.

FIG. 2 illustrates another embodiment where the organic light management film 16 includes only a substrate layer 16A, and the substrate layer 16A includes a plurality of raised features 20.

Figure 3:
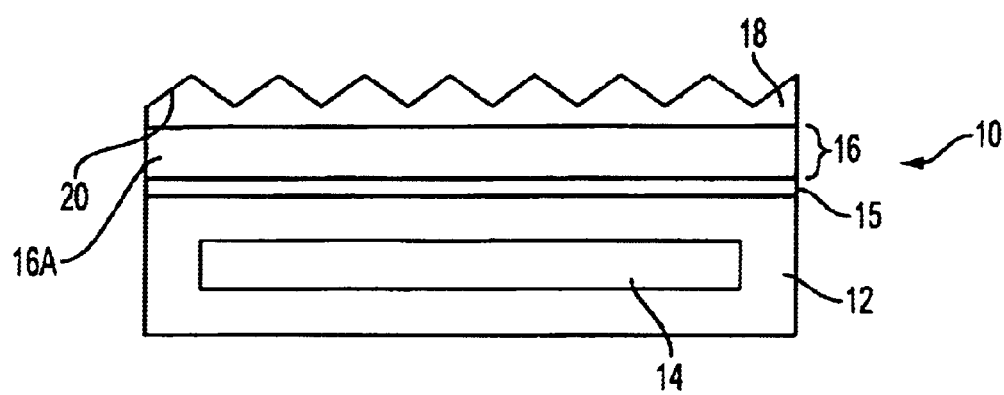
FIG. 3 is a side view of an optical structure according to another preferred embodiment of the invention.

FIG. 3 illustrates another embodiment where the organic light management film 16 includes only a substrate layer 16A. In this embodiment the substrate layer 16A does not include raised features, but the transparent inorganic film 18 disposed on the substrate layer 16A includes a plurality of raised features 20.

The structure 10 of the embodiments of FIGS. 1, 2 or 3 may also include an interlayer 15 disposed between the substrate 12 and the organic light management film 16. The interlayer 15 may be a thin metal layer, for example. Alternatively, the interlayer may be disposed between the organic light management film 16 and the transparent inorganic film 18.

Figure 4:
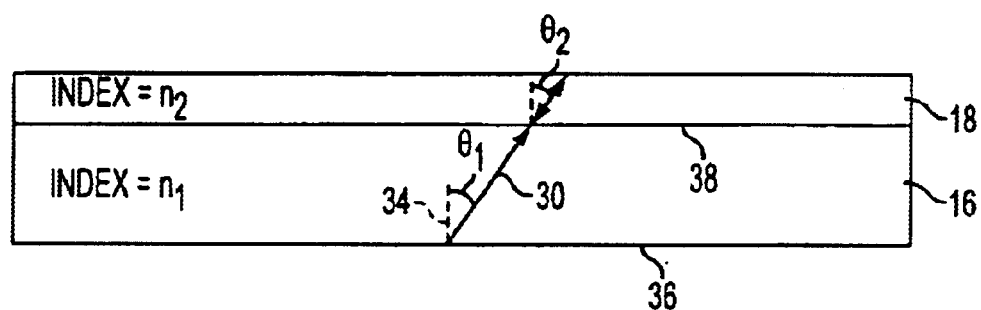
FIG. 4 is a schematic illustrating the optical effect of the high index inorganic film.

FIG. 4 illustrates the effect of the inorganic film 18 on the light emitted from the light source 10. For ease of illustration, only the inorganic film 18 and the organic light management film 16 are shown in FIG. 4. In the structure of FIG. 4, the organic light management film 16 and the inorganic film 18 have indices of refraction of n1 and n2, respectively, with n1<1.7 and n2>1.7. A light ray 30 travels in the organic light management film 16 at an angle (1 with respect to the normal 34 to the bottom surface 36 of the organic light management film 16. The light ray 30 is refracted at the interface of the organic light management film 16 and the inorganic film 18 due to the different indices of refraction for these materials according to known optical principles, and makes an angle (2 with respect to the normal to the surface 38 of the inorganic film 18.

Figure 5:
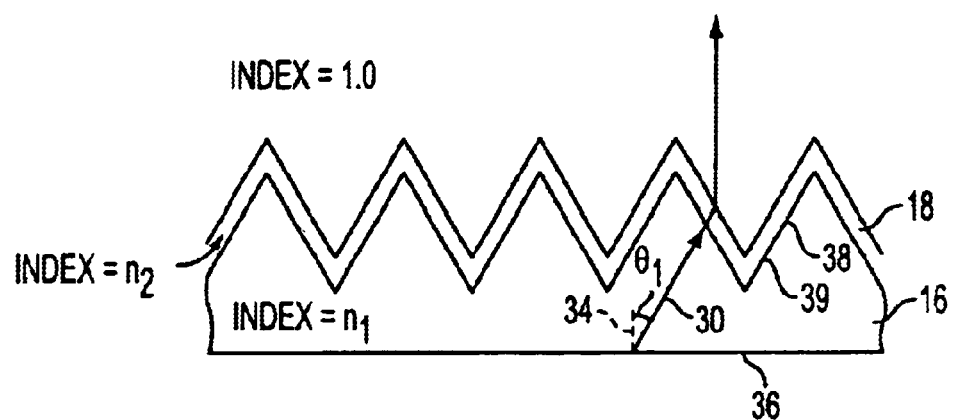
FIG. 5 is a schematic illustrating the optical effect of the high index inorganic film according to a preferred embodiment of the invention.

FIG. 5 illustrates the effect of the inorganic film 18 on the light emitted from the light source 10 in the case where the organic light management film 16 includes a number of raised features 20. FIG. 5 has the same structure as FIG. 4 except for the raised features 20. In this case the raised features 20 are prismatic structures having prismatic surfaces, and the inorganic film 18 is conformal to the organic light management film 16. In a similar fashion to the light ray 30 in FIG. 4, the light ray 30 in FIG. 5 travels in the organic light management film 16 at an angle (1 with respect to the normal 34 to the bottom surface 36 of the organic light management film 16. Again, the light ray 30 is refracted at interface of the organic light management film 16 and the inorganic film 18 due to the different indices of refraction for these materials according to known optical principles. In FIG. 5, the light ray 30 passes from the inorganic film 18 to air or vacuum with an index of refraction of about 1.0. Because the top surface 39 of the organic light management film 16 is not parallel to that of the bottom surface 36, and because the inorganic film 18 is conformal to the organic light management film 16, in FIG. 5, the light ray 30 may leave the inorganic film 18 in a direction which is normal to the bottom surface 36 of the organic light management film 16. Thus, a light ray which enters the organic light management film 16 at an oblique angle, may leave the inorganic film 18 at an angle normal to bottom surface 36 of the organic light management film 16. Thus, FIG. 5 illustrates an example of how oblique light rays may be redirected using the high index inorganic film 18.

The inorganic film 18 not only affects the directionality of light leaving the film 18, but also can selectively affect the polarization of the light, as disclosed in U.S. application Ser. No. 10/065,957, filed on Dec. 4, 2002, entitled "POLARIZATION SENSITIVE OPTICAL SUBSTRATE", which is hereby incorporated by reference in its entirety.

Figure 6:
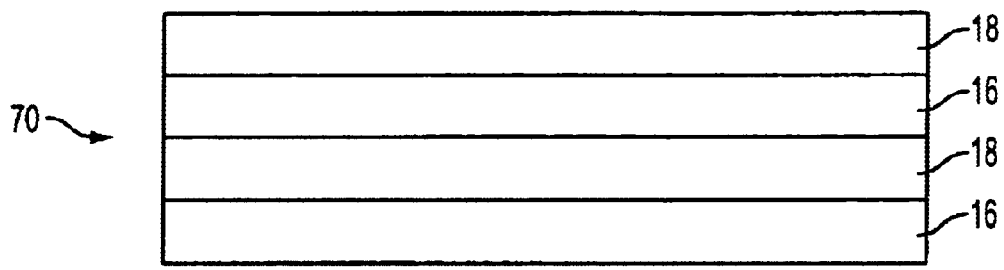
FIG. 6 is a side view of an optical structure acting as an interference filter according to a preferred embodiment of the invention.
Figure 7:
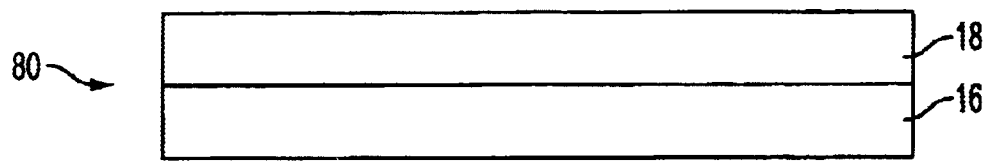
FIG. 7 is a side view of an optical structure acting as an interference filter according to another preferred embodiment of the invention.
Figure 8:
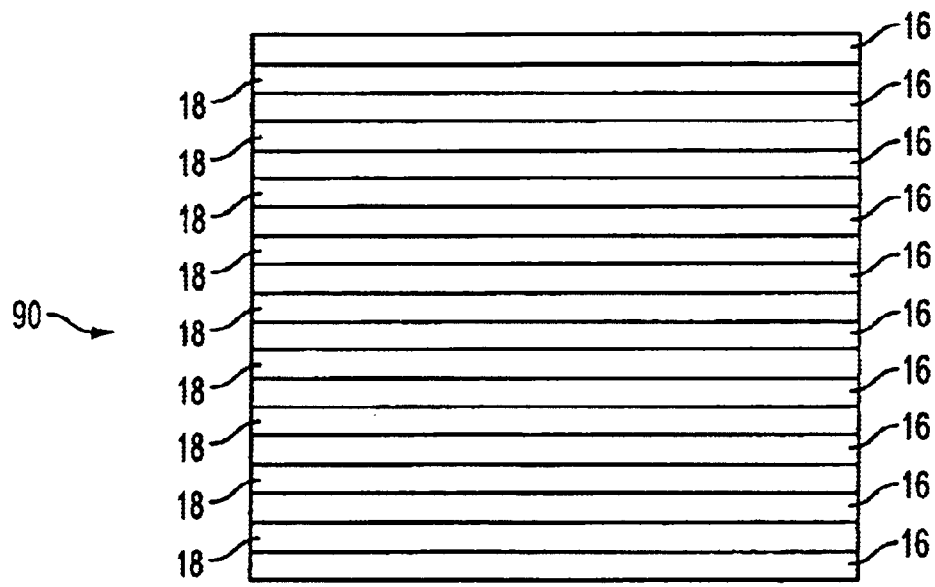
FIG. 8 is a side view of an optical structure acting as an interference filter according to another preferred embodiment of the invention.

FIGS. 6–8 illustrate embodiment of the invention where the inorganic films 18 and the organic light management films 16 alternate in optical structures, wherein the optical structures act as interference filters. An interference filter, as is known in the art, is a filter that controls the spectral composition of transmitted (and reflected) light energy in part through interference of light reflected at the layer interfaces of the films making up the filter.

For ease of illustration, only the inorganic films 18 and the organic light management films 16 are shown in FIGS. 6–8, not the light source 14 and substrate 12 of the embodiments of FIGS. 1–3.

FIG. 6 illustrates an embodiment with two inorganic films 18 and two organic light management films 16 arranged in alternate fashion. The optical structure 70 of FIG. 6 is arranged to operate as a narrow antireflection filter.

Figure 9:
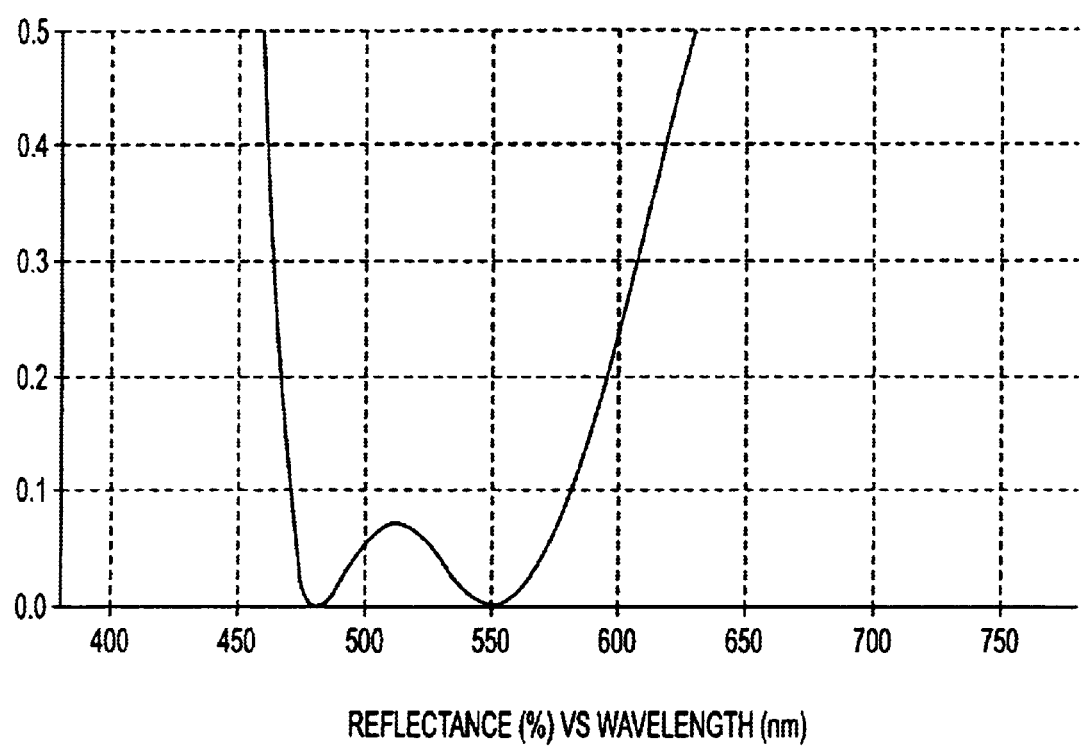
FIG. 9 is a graph illustrating the % reflectance as a function of wavelength for the optical structure of FIG. 6.

FIG. 9 is a graph showing the % reflectance as a function of wavelength for normal light incidence on the optical structure 70 of FIG. 6. FIG. 9 shows the % reflectance specifically for the case where the index of refraction of the inorganic films 18 and the organic light management films 16 is 2.5 and 1.45, respectively, and where the layer thicknesses from the top to the bottom layer in FIG. 6 is 17.35 nm, 35.32 nm, 132.66 nm and 94.50 nm, respectively.

FIG. 7 illustrates an embodiment with a single inorganic film 18 and a single organic light management film 16 arranged as shown. The optical structure 80 of FIG. 7 is arranged to operate as a wide antireflection filter.

Figure 10:
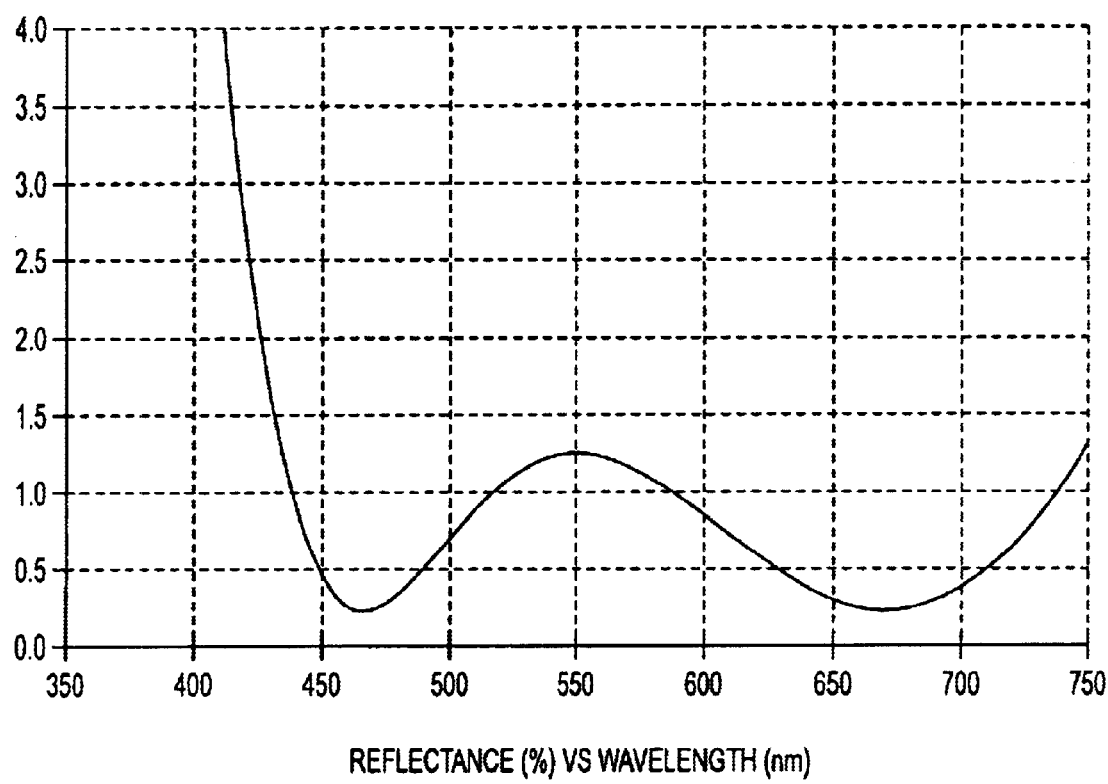
FIG. 10 is a graph illustrating the % reflectance as a function of wavelength for the optical structure of FIG. 7.

FIG. 10 is a graph showing the % reflectance as a function of wavelength for normal light incidence on the optical structure 80 of FIG. 7. FIG. 10 shows the % reflectance specifically for the case where the index of refraction of the inorganic film 18 and the organic light management film 16 is 2.05 and 1.38, respectively, and where the layer thicknesses of the inorganic film 18 and the organic light management film 16 in FIG. 7 is 134.15 nm, 99.64 nm, respectively.

FIG. 8 illustrates an embodiment with several inorganic films 18 and several organic light management films 16 arranged in alternate fashion. The optical structure 90 of FIG. 8 is arranged to operate as a wide band reflection filter.

Figure 11:
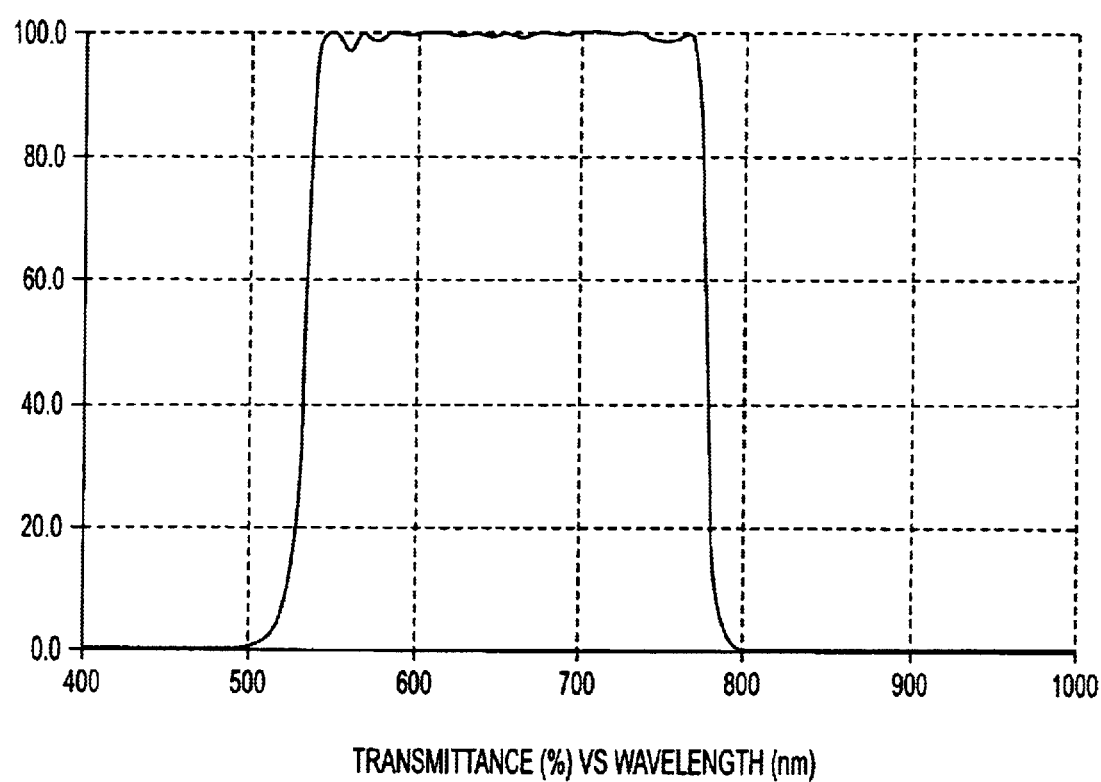
FIG. 11 is a graph illustrating the % transmittance as a function of wavelength for the optical structure of FIG. 8.

FIG. 11 is a graph showing the % transmittance as a function of wavelength for normal light incidence on the optical structure 90 of FIG. 9. FIG. 11 shows the % reflectance specifically for the case where the index of refraction of the inorganic films 18 and the organic light management films 16 is 2.35 and 1.45, respectively, and where the layer thicknesses from the top to the bottom layer in FIG. 8 ranges between about 20 nm and about 225 nm, respectively. The total number of inorganic films 18 and the organic light management films 16 together is 59 for the graph of FIG. 11. Of course in practice the total number of layers will vary depending upon the application.

Figure 12:
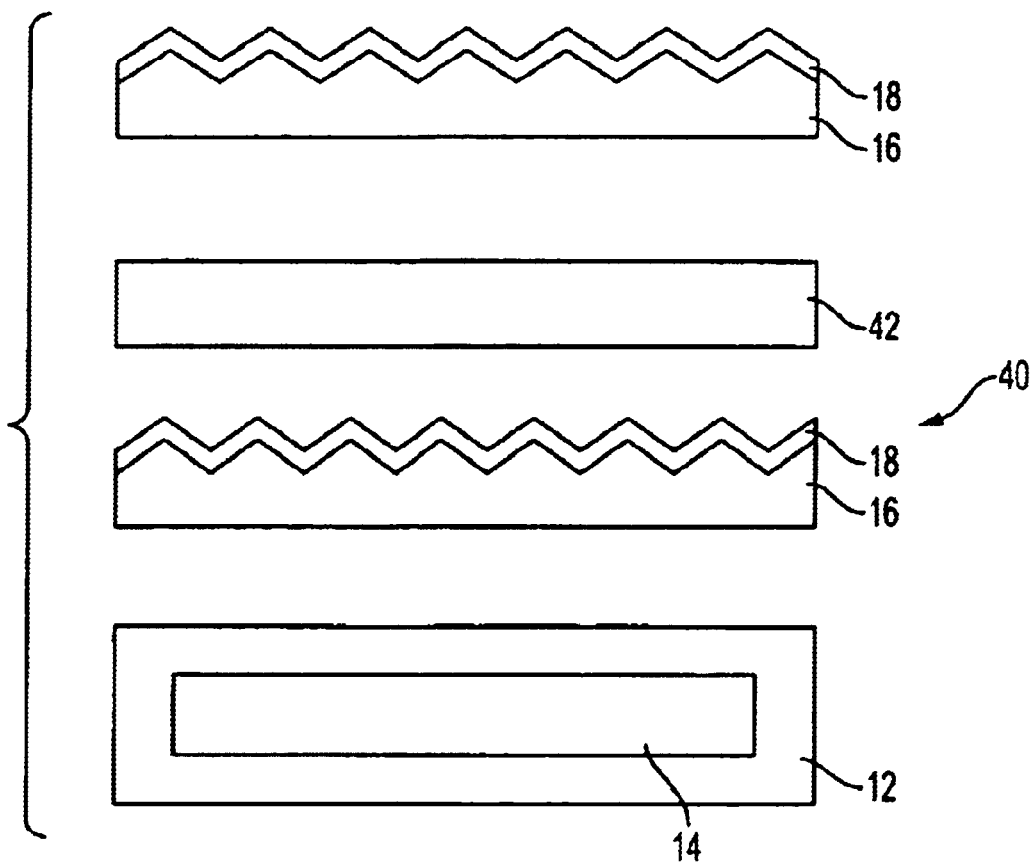
FIG. 12 is a side view of an optical device according to another preferred embodiment of the invention.

FIG. 12 is a schematic of an optical device 40 according to an embodiment of the present invention. The optical device 40 includes a modulation array 42 comprising a liquid crystal material. The modulation array selectively allows light to pass through a pixel of the array as is known in the art. The optical device 40 may be a liquid crystal display (LCD), for example. The optical device 40 may include elements of the optical structure described above with respect to FIG. 1.

The optical device 40 includes a substrate 12, which may be a backlight, for example, including a light source 14. Disposed between the modulation array 42 and the substrate 12, or on the opposite side of the modulation array 42 from the substrate 12 are one or more organic light management films 16 (with an index of refraction less than 1.7) with a corresponding adjacent transparent inorganic film 18 (with an index of refraction greater than 1.7). The organic light management film 16 may be one or more of a quarter wave plate, brightness enhancing film, retardation foil, diffuser film, color filter, high pass filter, band pass filter, low pass filter, for example. If the organic light management film 16 is a color filter, it may be a color filter array with individual red, blue and green pixel sized filters, for example. If a filter, the filter might be used as a color selective transflector.

The organic light management film 16 and the transparent inorganic film 18 may also be disposed alternately in a number of layers.

The organic light management films 16 may have a plurality of raised features 20, such as prismatic features, for example. The transparent inorganic films 18 may be disposed conformally on their respective organic light management film 16 with the plurality of raised features 20.

The organic light management film 16 may comprise a substrate layer and a overlayer as in the embodiment of FIG. 1, or just a substrate layer as in the embodiments of FIGS. 2 and 3. The organic light management film 16 and the transparent inorganic film 18 may also be arranged alternately as in the embodiments of FIGS. 6–8.

The transparent inorganic film 18 in the above embodiments of may be formed of inorganic materials such as, for example, metal oxides, such as titanium oxide and zinc oxide, or nitrides, such as silicon nitride, or oxynitrides, such as silicon oxynitride. The transparent inorganic film 18 may also be formed of ceramic compounds, such as boron carbon nitride. Thin transparent metal films may also be used for the transparent inorganic film 18. The transparent inorganic film 18 may also be formed of transparent conducting oxide coatings such as Indium Tin Oxide, Indium Oxide, Tin Oxide, or Cadmium Tin Oxide.

The material for the organic light management film 16 will depend upon the application, and may be, for example, an organic polymer such as polycarbonate.

Method of forming transparent inorganic filmThe transparent inorganic film 18 is preferably formed by depositing under vacuum in an enclosed deposition chamber. Because the film 18 is inorganic, there are a variety of deposition methods under vacuum in an enclosed deposition chamber which may be used. Suitable techniques for deposition of the transparent inorganic film 18 include physical vapor deposition techniques. These physical vapor deposition techniques include, for example, electron beam evaporation, thermal evaporation, and sputtering. Suitable techniques for deposition of the transparent inorganic film 18 also include chemical vapor deposition techniques. These chemical vapor deposition techniques include, for example, chemical vapor deposition, plasma assisted chemical vapor deposition, expanding thermal plasma deposition and atmospheric plasma chemical vapor deposition.

The raised features 20 either on the organic light management film 16, or on the transparent inorganic film 18, can be formed by conventional photolithography techniques, such as be depositing photoresist, exposing through a photomask, developing the photoresist to pattern it, followed by etching through the patterned photoresist.

The transparent inorganic film 18 may be deposited in a conformal fashion over existing raised features 20 in the organic light management film 16. However, for specific applications directional deposition either from normal angle or oblique angle relative to the substrate 12 may be preferred.

Either before or after the step of depositing the transparent inorganic film 18 under vacuum, the organic light management film 16 may be disposed into an optical structure which includes a light source, such as onto a backlight, for example.

Figure 13:
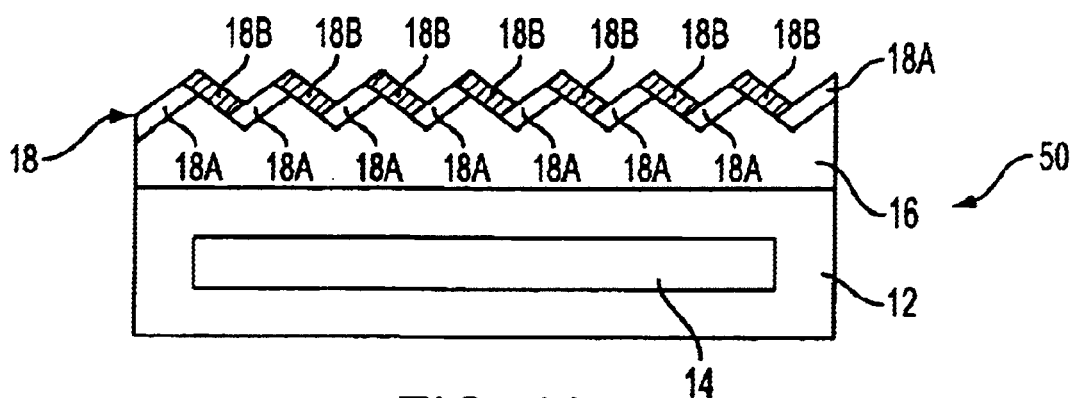
FIG. 13 is a side view of an optical structure according to another preferred embodiment of the invention.

With directional coatings, specific portions of the features may be coated without coating the entire feature 20. FIG. 13 illustrates an optical structure 50 where the raised features 20 are prismatic features, and only those portions of the features with a surface perpendicular to the direction from which the material is deposited are coated with a first transparent inorganic film 18A. In this case, the organic light management film 16 will be effected by the first transparent inorganic film 18A only for those portions covered by the first transparent inorganic film 18A.

The organic light management film 16 may comprise a substrate layer and an overlayer as in the embodiment of FIG. 1, or just a substrate layer as in the embodiment of FIG. 2.

Optionally, those portions of the organic light management film 16 not covered with the first transparent inorganic film 18A, may be covered with a second transparent inorganic film 18B. Together the first transparent inorganic film 18A and the second transparent inorganic film 18B make up the transparent inorganic film 18. The second transparent inorganic film 18B may be made of the same or a different material from the first transparent inorganic film 18A. Preferably the second transparent inorganic film 18B is made of a different material from the first transparent inorganic film 18A with a different index of refraction. Thus, a light ray passing through the optical structure 50 will encounter a different index of refraction passing through the first transparent inorganic film 18A as compared to the second transparent inorganic film 18B.

The second transparent inorganic film 18B may be formed by directional deposition after the first transparent inorganic film 18A. In this case, after the first transparent inorganic film 18A is formed, the orientation of the substrate is changed relative to the direction from which the material is deposited so that a different surface is perpendicular to the direction from which the material is deposited to form the second transparent inorganic film 18B.

The thickness of the organic light management films 16 and the transparent inorganic films 18 in the above embodiments will depend on the application but are typically between 10 nm and 10,000 nm. The thickness of the optical structures in the above embodiments will also depend on the application but are typically between 100 nm and 5 cm.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An optical structure comprising:
   a light source;
   an organic light management film having an index of refraction of less than 1.7 disposed above the light source; and
   a transparent inorganic film having an index of refraction of greater than 1.7 disposed on the organic light management film.

2. The optical structure of claim 1, wherein the transparent inorganic film comprises a first transparent inorganic film and a second transparent inorganic film, the first transparent inorganic film disposed on a first portion of the organic light management film and the second transparent inorganic film disposed on a second portion of the organic light management film different from the first portion.

3. The optical structure of claim 2, wherein the first transparent inorganic film has an index of refraction which is different from the index of refraction of the second transparent inorganic film.

4. The optical structure of claim 1, further comprising an interlayer disposed between the light source and the organic light management film.

5. The optical structure of claim 1, wherein the organic light management film includes a substrate layer and an overlayer.

6. The optical structure of claim 5, wherein substrate layer includes a plurality of raised features.

7. The optical structure of claim 6, wherein the plurality of raised features are plurality of prismatic features.

8. The optical structure of claim 5, wherein the overlayer includes a plurality of raised features.

9. The optical structure of claim 8, wherein the plurality of raised features are plurality of prismatic features.

10. The optical structure of claim 1, wherein the transparent inorganic film includes a plurality of raised features.

11. The optical structure of claim 1, wherein the organic light management film is one of a quarter wave plate, a brightness enhancing film, a retardation foil, a diffuser film, a color filter, a low pass filter, a band pass filter, a high pass filter, a color selective transflector, a neutral density filter, an IR blocking filter an UV blocking filter and combinations thereof.

12. The optical structure of claim 1, wherein the transparent organic polymer film comprises a polycarbonate.

13. The optical structure of claim 1, wherein the transparent inorganic film comprises a thin metal.

14. The optical structure of claim 1, wherein the transparent inorganic film comprises one of an oxide and a nitride.

15. The optical structure of claim 14, wherein the transparent inorganic film comprises one of silicon nitride and silicon oxynitride.

16. The optical structure of claim 14, wherein the transparent inorganic film comprises a metal oxide.

17. The optical structure of claim 16, wherein the metal oxide comprises at least one of titanium oxide, zinc oxide, indium tin oxide, indium oxide, tin oxide, and cadmium tin oxide.

18. The optical structure of claim 14, wherein the transparent inorganic film comprises boron carbon nitride.

19. The optical structure of claim 1, wherein the organic light management film and the transparent inorganic film act as an interference filter.

20. The optical structure of claim 19, including further alternating layers of the organic light management film and the transparent inorganic film.

21. The optical structure of claim 20, wherein alternating layers of the organic light management film and the transparent inorganic film act as one of a narrow band antireflection filter and a wide band reflection filter.

22. An optical device comprising:
   a backlight comprising a source of light;
   a modulation array comprising a liquid crystal material disposed above the back light;
   an organic light management film having an index of refraction of less than 1.7 disposed above the backlight; and
   a transparent inorganic film having an index of refraction of greater than 1.7 disposed on the organic light management film.

23. The optical device of claim 22, wherein the organic light management film is disposed between the backlight and the modulation array.

24. The optical device of claim 22, wherein the modulation array is disposed between the backlight and the organic light management film.

25. The optical device of claim 22, wherein the organic light management film is one of a quarter wave plate, a brightness enhancing film, a retardation foil, a diffuser film, a color filter, a low pass filter, a band pass filter, a high pass filter, a color selective transflector, a neutral density filter, an IR blocking filter, a UV blocking filter and combinations thereof.

26. The optical device of claim 22, wherein the transparent organic polymer film comprises polycarbonate.

27. The optical device of claim 22, wherein the transparent inorganic film comprises one of an oxide and a nitride.

28. The optical device of claim 27, wherein the transparent inorganic film comprises one of silicon nitride and silicon oxynitride.

29. The optical device of claim 27, wherein the transparent inorganic film comprises a metal oxide.

30. A method of forming an optical structure comprising:
providing an organic light management film having an index of refraction of less than 1.7;
depositing under vacuum a transparent inorganic film having an index of refraction of greater than 1.7 on the organic light management film; and
disposing the organic light management film into an optical structure which includes a light source before or after the step of depositing under vacuum.

31. The method of claim 30, wherein the depositing under vacuum comprises:
depositing the transparent inorganic film by physical vapor deposition.

32. The method of claim 31, wherein the depositing under vacuum comprises:
depositing the transparent inorganic film by at least one of electron beam evaporation, thermal evaporation and sputtering.

33. The method of claim 30, wherein the depositing under vacuum comprises:
depositing the transparent inorganic film by chemical vapor deposition.

34. The method of claim 33, wherein the depositing under vacuum comprises:
depositing the transparent inorganic film by at least one of chemical vapor deposition, plasma assisted chemical vapor deposition, expanding thermal plasma deposition, and atmospheric plasma chemical vapor deposition.

35. The method of claim 30, wherein the transparent inorganic film is deposited conformally on the organic light management film.

36. The method of claim 30, wherein the transparent inorganic film is directionally deposited on the organic light management film.

37. The method of claim 36, wherein the transparent inorganic film is directionally deposited on the organic light management film at an oblique angle relative to the substrate.

38. The method of claim 37, wherein the transparent inorganic film is directionally deposited on only a portion of the organic light management film.

39. The method of claim 30, wherein the organic light management film comprises a substrate layer and an overlayer.

* * * * *